Feb. 13, 1940.  K. BREITSCHWERDT  2,189,752
POULTRY DRAWER
Filed March 7, 1939
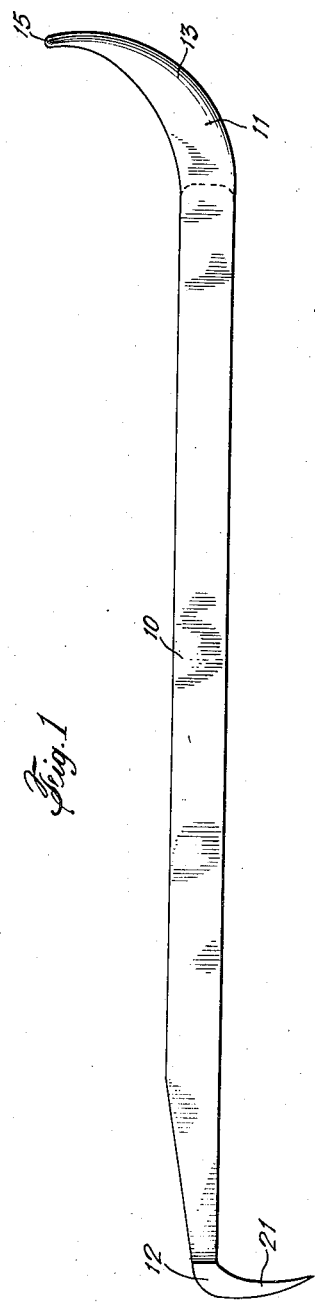
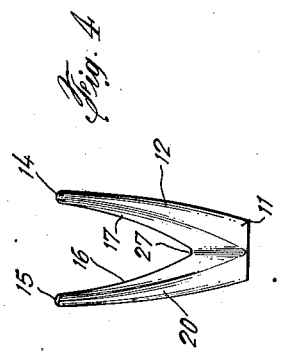
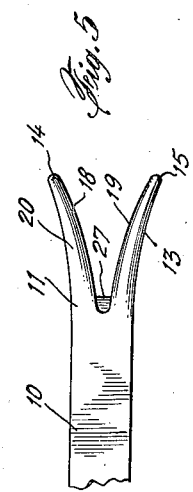
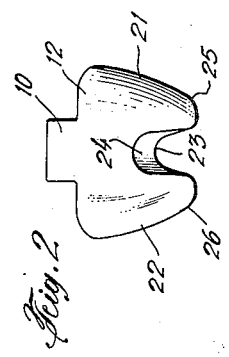
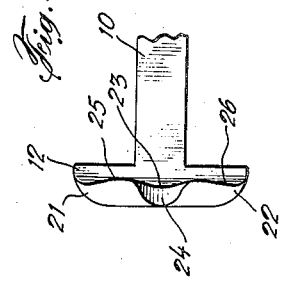
INVENTOR.
KARL BREITSCHWERDT
BY Benjamin Webster
ATTORNEY.

Patented Feb. 13, 1940

2,189,752

UNITED STATES PATENT OFFICE 2,189,752

POULTRY DRAWER

Karl Breitschwerdt, Brooklyn, N. Y.

Application March 7, 1939, Serial No. 260,281

2 Claims. (Cl. 17—11)

This invention relates to fowl or poultry drawers for removing the gizzard, heart, liver, lungs, kidneys, and other intestinal parts of the fowl which are usually removed when dressing the fowl for cooking, the chief object of the invention being to provide such a device that the cook or chef will not need to extend his hand into the fowl to remove the undesired parts.

An object of the invention is to provide a drawer having two fingers arcuated away from the axis of the handle and extending outwardly with reference to each other and having the rear edges of the insides rounded outwardly toward the rear, all of the parts being rounded or dull so as not to cut a pipe or the gizzard with the resultant spilling of the contents thereof and for removing the heart and liver without mutilation thereof.

Another object of the invention is to provide a poultry drawer having two cutting and pulling edges substantially at right angles and inclined like a hoe to the axis of the handle, with a recess therebetween for riding a bone, for cutting away and extracting the lungs and the kidneys.

Another object is to provide a complete, unitary poultry drawer which combines the foregoing objects in a single, unitary handy tool of low manufacturing cost, of durable construction, easily handled or suspended in the kitchen, adapted for drawing poultry, fresh or frozen, geese, turkeys, ducks, or any such game.

Other objects will appear in the description.

Reference is made to the drawing in which,

Fig. 1 is a side view.

Fig. 2 is a left end view.

Fig. 3 is a bottom view of the left end.

Fig. 4 is a right end view.

Fig. 5 is a top view of the right end.

A handle 10 of any desired size and length may support at one end a puller 11 for drawing, especially the gizzard, the heart, and the liver, from a fowl, and at the other end a cutter and puller 12 for cutting away and drawing, especially the lungs and the kidneys from a fowl. The parts 10, 11, and 12 may be formed as a unit from a single piece of stainless steel, or other suitable material, to provide ease in handling, durability and strength. The puller 11 may be of any desired size and comprises two prongs 13, 20, that extend outwardly from each other symmetrically and arcuately away from the axis of the handle 10, and terminate in smooth or rounded ends 15, 14. The insides of the prongs 13, 20 have rounded front edges 17, 16 and rounded rear edges 18, 19, and the crotch 27 is also rounded so that no part of the puller 11 will cut a pipe or the gizzard and therefore will draw these parts without spilling their contents. The cutter and puller 12 may be of any desired size and has its broadest part adjacent the handle 10 and has lower rearwardly tapering blades 21, 22, which are inclined to the handle about like the inclination of a hoe blade and which have sharp outer cutting edges at the rear which taper down inwardly towards the bottom and merge in transverse cutting edges 25, 26, the latter being separated by a notch 23 at the center to straddle a bone of the fowl and formed with a rearwards bevel cut 24 to provide a sharp cutting edge at the rear, that is, a continuous cutting edge is provided throughout the entire periphery up to the ends of the broad body portion adjacent the handle 10, so that the cutter and puller 12 may be rotated through three-quarters of a circle and be effective in any of these rotative positions.

Having shown and described a preferred embodiment of my invention and realizing that, in view of my disclosure, many changes in the details of construction, or in the materials, or in the size, will readily occur to those skilled in the art, I do not limit myself to the exact details shown but claim all variations within the spirit and scope of my invention.

I claim:

1. In a poultry drawer, in combination, a handle, and two prongs extending arcuately from the end thereof and away from each other, the inner sides thereof forming a slot gradually increasing in width outwardly, the edges of the inner sides being rounded throughout to prevent mutilation of the parts of the poultry that are withdrawn.

2. In a poultry drawer, in combination, a handle, and a hoe-like projection from the end thereof comprising two parts separated by a rounded notch adapted to straddle a bone of a fowl, the edge of the notch and all the edges of the projection being sharpened for cutting.

KARL BREITSCHWERDT.